Patented May 9, 1950

2,507,209

UNITED STATES PATENT OFFICE 2,507,209

METHOD OF MAKING COPOLYMERS

Edward A. Kern, Pittsfield, Mass., assignor to General Electric Company, a corporation of New York No Drawing. Application November 13, 1946, Serial No. 709,430

1 Claim. (Cl. 260—88.1)

This invention relates broadly to copolymers of vinyl compounds and to methods of preparing the same. More particularly, the invention is concerned with new and useful compositions of matter comprising the product of polymerization of a mixture of different copolymerizable ingredients including a monovinyltetrahydronaphthalene, specifically either $\alpha$ or $\beta$ vinyltetrahydronaphthalene, and a compound containing a $CH_2=C<$ grouping, more particularly a diene, e. g., butadiene, isoprene, piperylene, etc.; a vinyl-substituted aromatic hydrocarbon, e. g., styrene, methylstyrenes, divinylbenzene, vinylfluorenes, etc.; an acrylic compound, e. g., acrylonitrile, acrylamide, methacrylonitrile, methacrylamide, an ester of acrylic or methacrylic acid (e. g., methyl acrylate, methyl methacrylate, etc.); an ethylenically-unsaturated aliphatic hydrocarbon, e. g., ethylene, chloroethylenes, fluoroethylenes, chlorofluoroethylenes, etc., and the like.

In my copending application, Serial No. 709,428, filed concurrently herewith and assigned to the same assignee as the present invention, monovinyltetrahydronaphthalenes and the method of preparing these compounds is disclosed and claimed. I have discovered that these monomeric materials may be copolymerized with other polymerizable materials as set forth above, and the present invention is directed to the preparation of such copolymers.

As described in the above-mentioned application, monovinyltetrahydronaphthalenes are prepared by acetylating tetrahydronaphthalene with an acetylating agent, e. g., acetic acid or anhydride, acetyl chloride or bromide, ketene, etc., to obtain monoacetyltetrahydronaphthalene, hydrogenating the latter to form tetrahydronaphthalene methyl carbinol, and dehydrating the carbinol to obtain monovinyltetrahydronaphthalene.

Monomeric monovinyltetrahydronaphthalenes may be represented by the formula

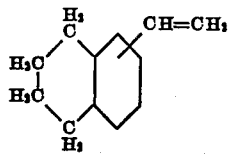

It will be apparent from the above formula that there are two compounds described, one in which the vinyl group is located in the $\alpha$ position, and another in which the vinyl group is located in the $\beta$ position on the aromatic ring. Both of these compounds are high boiling, and are clear and colorless when liquid. The $\alpha$ and $\beta$ monomers boil, respectively, at 91° C. and 135° C. at 2 mm. of mercury pressure. The melting point of the $\alpha$ substituted compound is about 25° C. The $\beta$ compound is liquid at ordinary temperatures.

Various methods of polymerizing mixtures of monomeric monovinyltetrahydronaphthalenes and other copolymerizable compounds may be employed, the most desirable method for any mixture depending largely on the properties of the other compound or compounds and the properties desired in the ultimate copolymer. For example, the mixture may be polymerized, as such, or it may be dissolved in a solvent with which all the members of the mixture are compatible. A small amount of solvent has little retarding effect upon, and in some cases actually accelerates, the polymerization of the mixtures. A moderately large amount of solvent tends to yield copolymers of short chain lengths and often results in a period of induction so that, even when very active catalysts such as boron fluoride are used, a period of time elapses between the addition of the catalyst and the beginning of polymerization. This tendency is particularly marked when the polymerization is carried out at elevated temperatures. A very large amount of solvent often inhibits or retards the polymerization of the mixtures to such an extent that polymerization is not effected in a reasonable time. Another method which has been found effective, includes the preparation of an intimate mixture of the monomeric materials by preparing a suspension or emulsion of the monomers in a medium, such as, for example, water.

The nature of the copolymers produced depends upon the conditions of polymerization and the purity of the monomers employed. In general, the purer the monomers, the more readily and completely the polymerization occurs. In some cases where a monovinyltetrahydronaphthalene normally copolymerizes with another monomer with difficulty and to only a slight degree, it will, in the presence of a third monomer, readily form a copolymer or a mixed polymer of the three compounds.

The polymerization of the mixtures of monomers may be accelerated or retarded as, for example, by varying the temperatures and types and quantities of catalysts employed. In general, it is desirable to choose conditions of polymerization such that the monomers polymerize at about the same rate. If the rate of polymerization of one monomer is considerably greater than that of the other monomer or monomers employed, it will go practically to completion before the other monomer or monomers have polymerized or copolymerized. This may lead to the formation of mixed polymerization masses instead of copolymers.

The polymerization of a monovinyltetrahydronaphthalene and mixtures thereof with other compounds that are copolymerizable with a monovinyltetrahydronaphthalene is accelerated by effecting the polymerization in the presence of a polymerization catalyst. Examples of polymerization catalysts that may be employed are oxygen, ozone, ozonides, hydrogen peroxide, organic and inorganic acids and acidic substances, e. g., hydrochloric acid, hydrofluoric acid, sulfuric acid, boron fluoride, stannic chloride, antimony pentachloride, the halogens (e. g. chlorine, bromine, etc.), etc., organic and inorganic peroxides, for instance peroxides of the aromatic acid series, e. g., benzoyl peroxide, etc., peroxides of the aliphatic acid series, e. g., acetyl peroxide, stearyl peroxide, lauryl peroxide, etc., sodium peroxide, barium peroxide, etc., various per-compounds such as the persulfates, perchlorates, perborates, etc. Also effective in increasing the rate of polymerization are substances having a large surface area, e. g., carbon black, finely divided silica, certain metallic powders and finely divided clays, etc. Heat, light (ultraviolet light) or heat and light may be used with or without a polymerizaton catalyst in accelerating the polymerization. Any suitable amount of catalyst may be used, but ordinarily the catalyst is employed in an amount ranging, for example, from a trace up to 2 or 3% or more by weight of the monomer or mixture of monomers.

The copolymerization products of the present invention may vary in accordance with the nature of the copolymerizable compound or compounds which are copolymerized with the monovinyltetrahydronaphthalene. Although the proportions ordinarily will be within the range of, by weight, 10 to 90% monovinyltetrahydronaphthalene to 90 to 10% of the other monomer or monomers, the amount of monovinyltetrahydronaphthalene may be either higher or lower, for instance, from 1 to 99%, by weight, of monovinyltetrahydronaphthalene to from 99 to 1%, by weight, of the other monomeric material or materials.

Monovinyltetrahydronaphthalene can be cross-linked by compounds such as divinyl, diallyl and diethylene glycol ester compounds to form products that have increased heat resistance and can be readily machined and worked. Such products tend toward insolubility and infusibility as the percent of divinyl compound increases. The copolymers of monovinyltetrahydronaphthalene with other vinyl compounds which contain only one $CH_2=C<$ group such as, for example, acrylic acid and acrylic acid esters are thermoplastic, and can be treated in general as any thermoplastic material. For example, they can be injection or compression molded, cast into films, oriented and fused.

The following examples will further illustrate how the invention may be carried out in practice, but the invention is not restricted by these examples. All parts are by weight.

Example 1

| | Parts |
|---|---|
| α-Vinyltetrahydronaphthalene | 13.2 |
| 2-vinyldibenzofuran | 19.4 |

The above ingredients were melted and mixed and the mixture was placed in a glass tube in an oven at 125° C. for 15 hours. The tube was then removed from the oven and allowed to cool to room temperature. The resulting copolymer was hard, clear, and substantially colorless.

The rate of polymerization of the mixtures of monomers increases as the temperature is increased. However, as the polymerization temperature is increased, the tendency is toward the formation of copolymers of shorter chain length, producing mechanically weaker materials. Stronger copolymers of longer chain length may be produced by carrying out the polymerization at lower temperatures, allowing a longer time for completion of the copolymerization.

Example 2

| | Parts |
|---|---|
| β-Vinyltetrahydronaphthalene | 13.2 |
| 2-vinyldibenzofuran | 19.4 |

The above monomers were melted and mixed and the mixture was placed in a glass tube in an oven at a temperature of 75° C. for 36 hours. The tube was removed from the oven and allowed to cool to room temperature. The resulting copolymer was a solid, hard, clear, glass-like mass.

Example 3

| | Parts |
|---|---|
| α-Vinyltetrahydronaphthalene | 13.2 |
| Styrene | 10.4 |

The above ingredients were mixed and heated 4 hours at 80° C., 4 hours at 100° C., and 15 hours at 125° C., yielding a hard, clear, colorless copolymer.

Example 4

| | Parts |
|---|---|
| α-Vinyltetrahydronaphthalene | 13.2 |
| 2-vinylfluorene | 19.4 |

The monomeric materials were mixed and placed in a glass tube. The mixture was then heated at 125° C. for 15 hours. The resulting copolymer was hard, clear, and slightly yellow in color.

Example 5

| | Parts |
|---|---|
| α-Vinyltetrahydronaphthalene | 13.2 |
| Butadiene | 5.4 |
| Potassium hydroxide | 0.1 |
| Stearic acid | 0.25 |
| Potassium persulfate | 0.2 |
| Water | 60.0 |
| Di-octyl sodium sulfosuccinate (10% water solution) | 2.5 |

All the above ingredients, except the butadiene, were mixed and placed in a pressure vessel. The vessel was cooled to 0° C. and liquified butadiene was added. The vessel was then sealed, heated to raise the temperature of the contents to about 45° C., and shaken to emulsify the mixture. The emulsion was then heated in the pressure vessel at 45° C. for 15 hours. The vessel and contents were then cooled to room temperature, the vessel was opened, and the copolymer was precipitated by pouring the emulsion into a 5% solution of hydrochloric acid. The precipitated copolymer was then washed with water several times, dried, and dissolved in benzene. A film of the copolymer cast from the benzene solution was slightly milky, translucent, and flexible.

Example 6

|   | Parts |
|---|---|
| β-Vinyltetrahydronaphthalene | 13.2 |
| Isoprene | 6.9 |
| Potassium hydroxide | 0.1 |
| Stearic acid | 0.25 |
| Potassium persulfate | 0.2 |
| Water | 60.0 |

All of the above ingredients, except the isoprene, were mixed and the mixture was polymerized by the method set forth in Example 5. A film of the resulting copolymer, when cast from a benzene solution, was clear, colorless, and flexible.

The properties of films prepared from polymerized mixtures of monovinyltetrahydronaphthalene and compounds of the diene type may be widely varied depending on the proportions of the monomers present in the initial mixture. More specifically I have found that as the ratio of diene to monovinyltetrahydronaphthalene increases, the resulting films tend to be more tough and rubbery.

The copolymers of this invention may, in general, be modified to fill the requirements of specific applications for which the copolymers as such are not suitable. For example, plasticizers and fillers may be added to the mixtures of monomers prior to copolymerization, or they may be added after the polymerization of the mixtures has been completed. In general, plasticizers commonly used for polymers and copolymers known to the art may be employed in plasticizing the copolymers of this invention. The selection of the proper plasticizers depends largely on the properties of the particular copolymer involved. Useful molding powders may be prepared by mixing the copolymers with suitable fillers such as, for example, alpha cellulose, mica dust, oxides of titanium, talc, zinc oxide, magnesium oxide, asbestos, quartz, wood flour, cellulose or wool fibers, etc.

Various polymerizable compounds in addition to those heretofore specifically mentioned, may be simultaneously polymerized or copolymerized with monovinyltetrahydronaphthalenes to obtain new and useful synthetic compositions, for instance any compound containing a $CH_2=C<$ grouping (polymerizable $CH_2=C<$ grouping) in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and α-substituted acrylic acids, vinyl esters and halides, methylene malonic esters, mono- and poly-allyl compounds, e. g., the di-, tri, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

Benzyl acrylate
Benzyl methacrylate
Methyl alpha-chloroacrylate
Ethyl alpha-bromoacrylate
Propyl alpha-chloroacrylate
Para-chlorostyrene
Allyl acrylate
Allyl methacrylate
Methallyl acrylate
Di- and tri-chlorostyrenes
Chlorinated divinylbenzenes
Vinyl methyl ether
Vinyl ethyl ether
Divinyl ether
Methylene methyl malonate
Methylene ethyl malonate
Vinyl chloride
Vinylidene chloride
Diethylene glycol dimethacrylate (diethylene dimethacrylate)
Glyceryl triacrylate
Ethylene glycol diacrylate (ethylene diacrylate)
Diethylene itaconate
Diethyl maleate
Dimethyl fumarate
Para-chlorobenzyl acrylate
Diallyl fumarate
Diethyl itaconate
Diallyl citraconate
Divinyl biphenyl
Vinyl methyl ketone
Cyclopentadiene
2-chloro-butadiene-1,3 (chloroprene)
2,3-dimethyl-butadiene-1,3
Chlorinated methylstyrenes
Chlorinated vinylnaphthalenes
Hexadiene-1,5
Octadiene-1,4
2-cyano-butadiene-1,3
Dimethallyl maleate
Dimethallyl itaconate
Dimethallyl phthalate
Amyl acrylate
Hexyl methacrylate
Triallyl citrate
Triallyl aconitate
Vinyl acetate
Vinyl propionate
Vinyl butyrate The copolymers of this invention have a wide variety of commercial applications. They may be used alone or in combination with other insulating materials, e. g., paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the product of polymerization of a polymerizable mass containing a monovinyltetrahydronaphthalene as an essential ingredient. Paper-insulated capacitors wherein paper impregnated with a composition comprising a copolymer of a monovinyltetrahydronaphthalene constitutes the dielectric material is a more specific example of the use of the compositions of my invention in electrical applications. Such capacitors may be produced in accordance with conventional manufacturing technique, for instance as described and illustrated in Clark Patent No. 1,931,373, with particular reference to a different impregnant. My new copolymers also may be employed as cable impregnants, in impregnating electrical coils, as filling compounds in potheads and cable joints, and in numerous other electrical applications. The device to be treated may be impregnated or filled with the polymerizable mixture (e. g., mixture of monomers, mixture of partial polymers, or mixture of monomer and partial polymer), and polymerization effected in situ.

What I claim as new and desire to secure by Letters Patent of the United States is:

The method which comprises (1) forming a mixture of ingredients consisting, by weight, of 13.2 parts alpha-vinyltetrahydronaphthalene and 10.4 parts styrene and (2) heating the mixture successively for four hours at 80° C., for four hours at 100° C., and 15 hours at 125° C. until a hard, clear, colorless copolymer is formed.

EDWARD A. KERN.

REFERENCES CITED

The following references are of record in the file of this patent:

UNITED STATES PATENTS

| Number | Name | Date |
|---|---|---|
| 2,047,398 | Voss | July 14, 1936 |
| 2,067,304 | Tschunkur | Jan. 12, 1937 |

FOREIGN PATENTS

| Number | Country | Date |
|---|---|---|
| 233,649 | Great Britain | Dec. 15, 1925 |
| 585,541 | Germany | Oct. 5, 1933 |
| 598,732 | Germany | May 31, 1934 |

OTHER REFERENCES

Mark et al., High Polymeric Reactions of High Polymer Series (1941), vol III, pp. 81-83.